May 17, 1966 M. SCHLICHTE 3,251,947

ATTENUATION EQUALIZATION DEVICE IN A COMMMUNICATION SYSTEM WITH A TWO-CONDUCTOR MULTIPLEX BAR

Filed Sept. 24, 1962 3 Sheets-Sheet 1

Inventor:
Max Schlichte
By [signature] Atty

Inventor,
Max Schlichte
By [illegible]
Atty.

May 17, 1966 M. SCHLICHTE 3,251,947

ATTENUATION EQUALIZATION DEVICE IN A COMMMUNICATION SYSTEM WITH A TWO-CONDUCTOR MULTIPLEX BAR

Filed Sept. 24, 1962 3 Sheets-Sheet 3

Inventor.
Max Schlichte.
By [signature] Atty.

United States Patent Office 3,251,947
Patented May 17, 1966

3,251,947

ATTENUATION EQUALIZATION DEVICE IN A COMMUNICATION SYSTEM WITH A TWO-CONDUCTOR MULTIPLEX BAR

Max Schlichte, Munich, Germany, assignor to Siemens & Halske Aktiengesellschaft, Berlin and Munich, Germany, a corporation of Germany Filed Sept. 24, 1962, Ser. No. 225,935
Claims priority, application Germany, Sept. 26, 1961, S 75,936
10 Claims. (Cl. 179—15)

The invention disclosed herein is concerned with time multiplex communication systems such as are used in the communication art, that is, communication systems wherein messages which are being exchanged between individual subscribers are modulated on impulse sequences which are mutually displaced or staggered and which therefore can be interlaced as to time and transmitted over multiplex bars, thus making a plural utilization of connection paths possible.

Such time multiplex systems can be constructed in different manner. In connection with the present invention, only those time multiplex communication systems are of interest, which are provided with two-conductor multiplex bars to which the subscriber lines are periodically impulse-wise connectible by means of time channel switches.

It is in such time multiplex communication system often necessary to transmit the signals which serve the exchange of messages, therefore, especially speech signals, over subscriber lines and over trunk lines of totally different lengths and characteristics. The signals transmitted over such lines are thereby according to the length and characteristics of the lines from case to case differently attenuated. Such different attenuation is, however, generally speaking, undesired, since the reference attenuation of such a transmission system should lie within very definite limits, for example, 1 to 2.5 nepers, such requirement being posed, for example, in consideration of noise obtaining frequently in the vicinity of the electroacoustic transducers of interconnected end stations as well as in consideration of disturbing side tone signals. However, it is for this purpose necessary that the communication line extending between the end stations, which may in given cases include various line sections, has a line attenuation which is to a far reaching extent independent of the length and characteristics of the line.

It is already known to equalize in various manner the attenuation differences of lines in order to obtain a reference attenuation of transmission systems which is as identical as possible, independently of the lines extending between end stations. For example, it is known to insert at respective subscriber stations a non-linear resistance between the two line conductors, such resistance being controlled by the battery feed direct current which is transmitted over the respective subscriber line and which is dependent upon the line attenuation, whereby the attenuation contribution of the non-linear resistance increases with increasing loop current (at shorter line or larger conductor cross section) while decreasing with dropping loop current, thereby bringing about an equilization of the attenuation amount. However, all that can be achieved with such a measure is, that the reference attenuation of a transmission system does not become too low.

It is also known to use for the de-attenuation of lines negative line resistances or negative transverse conduction values. However, with the aid of a negative line resistance can only be avoided losses which otherwise are caused by ohmic longitudinal resistances disposed in direct series relationship, and with the aid of a negative transverse conduction value can only be avoided losses which are otherwise caused by ohmic transverse conduction values lying directly parallel thereto. All that can be achieved in this way is a reduction of the attenuation of a transmission system. If the magnitude of the negative resistance or negative conduction value, respectively, were made greater than that of the loss resistance or the conduction value, respectively, there would be excited undesired oscillation in the corresponding transmission system.

Negative resistances and conduction values can also be employed jointly for the de-attenuation of lines, which are as so-called "negative impedance amplifiers," hereinafter referred to as NLT amplifiers, inserted in the line. With the aid of such NLT amplifier, which can in principle be constructed as a T-member bridged by a negative longitudinal resistance with a negative transverse conduction value, can be equalized losses of ohmic resistances as well as of transverse conduction values. The gain of the NLT amplifier is thereby fixedly adjusted in accordance with the amount of attenuation of the line. The gain which is obtainable, without occasioning undesired oscillations is thereby the higher the greater the echo attenuation is in the corresponding transmission system. This presupposes line junction points which are to a large extent free of reflection; the wave impedance of the NLT amplifier must be made equal to the wave impedance of the respective line involved. An alteration of the amplifier adjustment is not readily possible, as it would require alteration of the negative longitudinal resistances as well as of the transverse conduction value, whereby a definite mutual dependence between both would have to be considered so as to maintain as well as possible the original matching conditions.

The application of the known measures entails at any rate the use of different attenuation equalization circuits under consideration of the attenuation degree of a line that is present and depending upon whether an additional attenuation or a de-attenuation is to be obtained.

These known measures also entail considerable expenditure since they require the provision of an individual attenuation equalization circuit for each line extending to the subscriber stations and also for trunk lines extending to other exchanges.

Time multiplex communication systems are also known, wherein amplifiers for raising the level, can be connected to the multiplex bar (see for example, German Patent No. 947,249, page 2). The amplifiers are as it were located at a central place and amplify in similar manner the speech signals of all speech circuits conducted over the respective multiplex bar, whereby the amplifier gain must naturally be dimensioned so that the amplification suffices also for the speech circuit with the strongest line attenuation. However, in view of the insertion of the amplifiers, the multiplex bar must be constructed in such systems as a four-conductor bar. It is however desirable to construct not only the subscriber lines but also the multiplex bar as two-conductor paths, which is not the case in these known time multiplex communication systems. Moreover, such known mode of amplification with the aid of a central amplifier to be inserted into the multiplex bar often does not meet the actually present requirements, since it produces an unnecessarily high and often impermissibly high amplification in connection with speech circuits with low line attenuation, so that further requirements posed for the respective connection, for example, with respect to cross-talk, cannot be met. One the other hand, if lower amplification were provided for, so that such requirements could be met, it would be insufficient for speech circuits with the highest line attenuation.

The present invention shows a way for overcoming such difficulties and to provide also in connection with time multiplex communication systems having two-conductor multiplex bars an attenuation equalization which is individually matched to respective subscriber lines, without requiring for such purpose any particular expenditure.

The invention is accordingly concerned with a time multiplex system operating with a two-conductor multiplex bar to which the connection lines (subscriber lines or trunks) are periodically connectible with the aid of time channel switches, whereby the multiplex bar is connected with a coupling network over which are conducted connections between subscriber lines or stations as well as connections with other communication systems or exchanges, such system comprising an attenuation equalization device which is inserted in the multiplex bar between the multiplex point at which are combined the time channel switches and the coupling network, said attenuation equalization device being in each speech phase at which a connection line is connected to the multiplex bar, operable to control respectively the attenuation or de-attenuation of the respective connection lines, responsive to a control signal which indicates the attenuation of the respective connection line.

The time multiplex communication system according to the invention therefore makes it possible to determine respectively the attenuation or amplification of the attenuation equalization device inserted in the two-conductor multiplex bar, that is, incident to each speech phase, just as it is required according to the line attenuation of the connection line which is at such speech phase connected to the multiplex bar. It is in this manner possible to obtain for each connection the same line attenuation irrespective of the kind and length of the line sections which are being utilized, without requiring for each line section, and especially for each subscriber line, an individual attenuation equalization device with an attenuation or amplification dimensioned individually to the corresponding line section.

Details of the invention will now be explained with reference to the accompanying drawings.

Figures 3A, 3B, 3C, 3D:
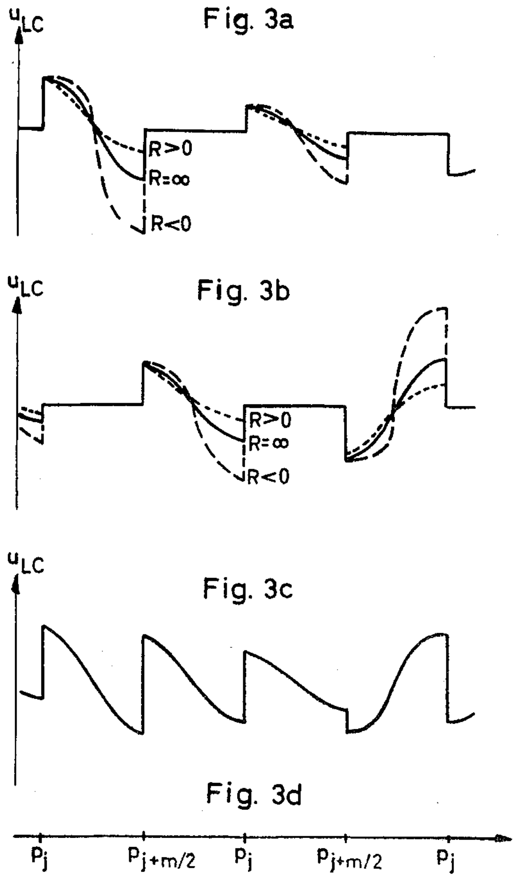
Figure 4:
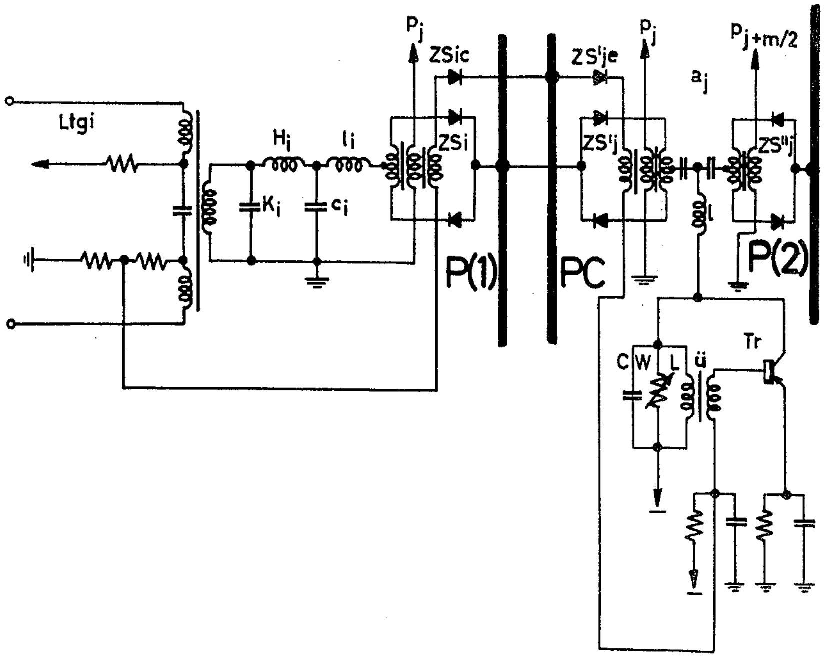

FIGS. 3*a* to 3*d* show the voltage occurring at an oscillation circuit as a function of time; and FIG. 4 illustrates an attenuation equalization device comprising, among others, a negative parallel resistance formed by a feedback coupled amplifier including a transistor.

Figure 1:
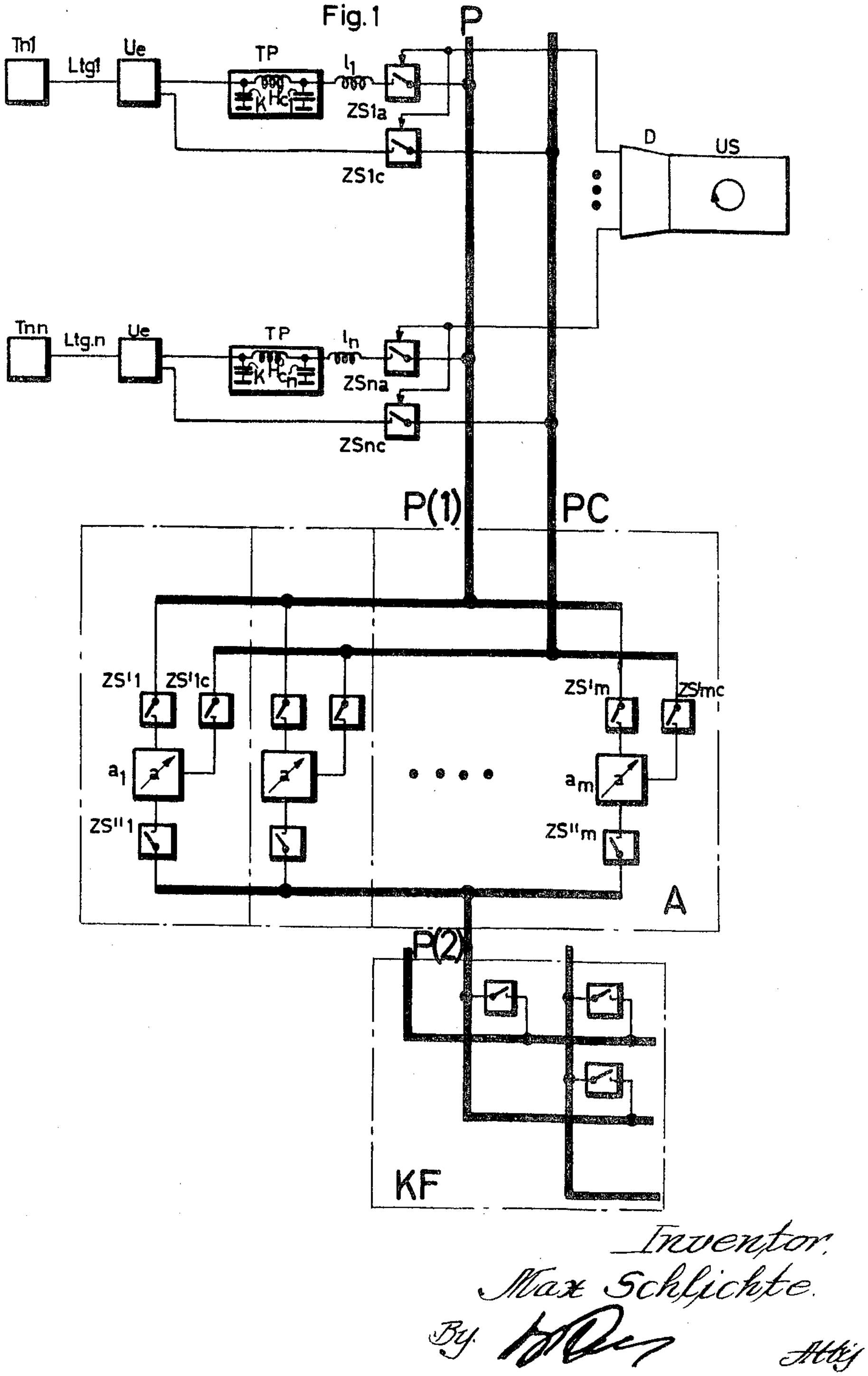
FIG. 1 shows portions of a time multiplex telephone system to the extent required for an understanding of the invention.

In FIG. 1, references L*tg*1 . . . L*tgn* indicate connection lines which are connected to the system and which extend to subscriber stations T*n*1 . . . T*nn* or to other exchanges. These connection lines are over controlled time channel switches ZS1*a* . . . ZS*na* connectible with the two-conductor multiplex bar P. The time channel switches are controlled by control pulses which are supplied with the cooperation of cyclic storers such as US, in which are cycled in coded form the numbers of the subscribers which are respectively engaged in connections. These numbers which are in coded form are also referred to as addresses. The output of the cyclic storer is connected with a so-called triggering decoder D. Each triggering decoder has as many outputs as there are subscribers in the corresponding system, each such output being allocated to a definite subscriber. When the address of a subscriber is delivered to a triggering decoder, there will be given off an impulse at the output thereof, which impulse is allocated to the respective subscriber, such impulse serving for the operative control of the time channel switch ZS which is allocated to the corresponding subscriber T*n*. The line L*tg* of a subscriber station T*n* which is involved in a connection (call) is in this manner momentarily connected with the multiplex bar P. This is periodically repeated with the cycling period of the addresses which are being cycled in the cyclic storer US. In this manner is effected the desired connection between the involved connection line L*tg* (in the case discussed a subscriber line) and another connection line, which is synchronously therewith connected to the multiplex bar P, and which is at least at the respective instants connected with such multiplex bar. This connection which is to be established at least at the respective connection instants can be effected with the aid of a suitable coupling network KF to which the multiplex bar P is connected over its terminal P(2)′ such network having for each pair of multiplex bars P which are to be connected with each other, a coupling point with coupling point contact connected with the respective multiplex bars. Such coupling networks are known and further details with respect thereto are here omitted, particularly since they are unnecessary for an understanding of the invention.

It is also possible, with the aid of speech energy storers which are in a system or exchange connectible to the multiplex bar in place of subscriber stations or trunk lines leading to other exchanges, to produce in this manner, as previously described, connections between subscriber lines of one and the same system or exchange, whereby the two subscriber lines are connected with the multiplex bar at different instants while the intervening intervals are bridged with the aid of the speech energy storers.

It is further possible to provide, in a time multiplex communication system, two multiplex bars, one for the outgoing traffic and one for the incoming traffic, whereby connections between subscriber lines of one and the same system or exchange are, at least for the instants at which the two lines are connected with the respective multiplex bars, interconnected in the coupling network, and whereby such a connection can in given cases become permanent.

In the multiplex bar P of the system shown in FIG. 1 is inserted an attenuation equalization circuit A. This circuit comprises a plurality of partial devices $a_1$ . . . $a_m$, for the attenuation equalization, said partial devices being respectively allocated to speech phases at which connection lines L*tg* are respectively connected with the multiplex bar P. The attenuation equalization devices $a_1$ . . . $a_m$ comprise, respectively, a controllable attenuation equalization member as well as two switches as indicated at ZS′1 . . . ZS′*m* and ZS″1 . . . ZS″*m*, said switches being connected to the points P(1) and P(2) of of the multiplex bar P. These partial devices $a_1$ . . . $a_m$ are respectively allocated to one of the speech phases $p_1$ . . . $p_m$, at which respective lines L*tg*1 . . . L*tgn* are periodically impulse-wise connectible to the multiplex bar P by periodically impulse-wise actuation of the respective switches ZS′ at the same speech phase, whereby the corresponding attenuation equalization device such as $a_1$ . . . $a_m$ is connected to the multiplex point P(1) coincident with such speech phase and thus connected with the connection line which is coincidently connected with the multiplex bar.

The attenuation equalization device A is controlled as to its attenuation or de-attenuation degree, during each speech phase at which a connection line L*tg* is connected with the multiplex bar P, by a control signal which signifies the line attenuation of the corresponding connection line. The multiplex bar P is for this purpose provided with an auxiliary control line PC to which are periodically impulsewise connectible, with the aid of respective auxiliary contacts ZS′*lc* . . . ZS′*mc* which are respectively cooperatively associated with the time channel switches ZS1 . . . ZS*n*, only the line points of the connection lines which are traversed by direct current flowing in the respective line loops. As will be presently explained more in detail with reference to FIG. 4, such a line point may lie in the direct current battery feed for the corresponding connection line.

To the control line PC is, at the same speech phase at which a connection line L*tg* is connected to the multiplex bar P(1), connectible the control input of the respective attenuation equalization device such as $a_1 \ldots a_m$, with the aid of a switch ZS′ which likewise has an auxiliary contact ZS′c, said attenuation equalization device being operatively effective due to impulse-wise actuation of the corresponding switch ZS′, so that a control signal is extended to the respective attenuation equalization device, which signal corresponds to the amplitude of the direct current flowing in the line loop of the connection line which is at a given speech phase momentarily connected with the multiplex bar P.

It will be apparent from FIG. 1 that the control signal which corresponds to the direct current flowing in the line loop can be derived from a line transmission U*e* disposed between the connection line L*tg* and a low pass filter TP with the storage capacitor *c*, which is located ahead of the cooperatively associated time channel switch ZS, such line transmission U*e* terminating the connection line L*tg*.

Accordingly, the control signal for a speech phase is newly formed incident to each sampling period, that is, upon each closure of a contact ZS*a* of the respective time channel switch ZS, which connects a connection line L*tg* with the multiplex bar P, since the auxiliary contact ZS*c* of the time channel switch ZS is likewise closed.

This control signal is extended to the attenuation equalization device A, and in such device to the respective partial device such as $a_1 \ldots a_m$ which is allocated to the corresponding speech phase, the switch ZS′ of which is at such speech phase periodically impulse-wise closed, and which is, therefore, connected with a connecting line L*tg* which is at such speech phase periodically impulse-wise connected with the multiplex bar P.

It shall however be particularly noted at this point, that the attenuation equalization device A may in a given case also be formed of a single attenuation equalization member which is operatively controlled in each speech phase, as to its attenuation or de-attenuation action. The attenuation equalization device is in any event in each speech phase at which there is a connection with an end station of the system, active with an attenuation or amplification which corresponds to the attenuation caused by the corresponding connection line, so that a desired attenuation is obtained irrespective of the kind and length of the corresponding connection line.

According to another feature of the invention, the partial devices such as $a_1 \ldots a_m$ of the attenuation equalization device A shown in FIG. 1, can be respectively formed by an energy storer with a variable time constant depending upon the control signal, which energy storer is connected at the junction point of two switches ZS′ and ZS″ which are inserted serially in the multiplex bar P and operated periodically mutually displaced or staggered as to time. The advantage of such a partial device resides in that either a de-attenuation or also an additional attenuation of a two-conductor line can be achieved therewith, without entailing any alteration with respect to the circuitry of the corresponding partial device. It will in such case suffice to change with the aid of the control signal the time constant of the energy storer included in the partial device, that is, the time constant which is important respectively for the speed of the decrease or increase of the signal energy stored in the storer, so as to obtain with a positive time constant of more or less greater magnitude a stronger or weaker attenuation or to achieve with a reduced negative time constant a stronger or weaker de-attenuation.

This gives the possibility to carry out in simple manner an alteration of the attenuation or amplification, without producing a disturbing influence with respect to the matching conditions in the respective transmission system. Moreover, as will be presently explained more in detail, such an energy storer is adapted to take at the closure instant of a switch the entire signal energy thus offered to it. Accordingly, no reflections are caused in the multiplex bar, which is of particular importance in view of the obtainable side tone attenuation of the respective transmission system.

Figure 2:
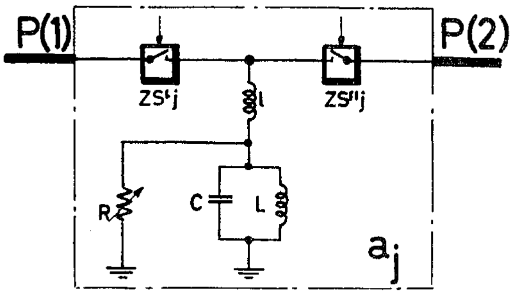
FIG. 2 represents an attenuation equalization device.

FIG. 2 shows such an attenuation equalization device $a_j$ wherein the energy storer is formed by a parallel oscillation circuit with a parallel resistor R which is controlled by the control signal. This parallel oscillation circuit is connected to the junction point of the two switches, designated ZS′*j* and ZS″*j* in FIG. 3, (see also FIG. 1) which are serially inserted in the multiplex bar P between the points P(1) and P(2). The switches ZS′*j* and ZS″*j*, as well as the corresponding switches in FIG. 1, may be electronic switches. The parallel oscillation circuit is tuned to an intrinsic frequency which is equal to the switching frequency at which the two switches ZS′ and ZS″ are impulsewise closed, uniformly mutually displaced as to time, or equal to an integral multiple of such frequency. The parallel resistor R is controllable so that its value becomes, depending upon the control signal, positive, infinite or negative. The parallel resistance R can for this purpose be formed by an ohmic resistance and a negative resistance connected parallel therewith. The negative resistance can thereby be formed, in known manner, by a feedback coupled amplifier circuit with a transistor, which is operatively controlled in its characteristic working point by the control signal, in a manner which will be more in detail explained with reference to FIG. 4.

The operation of the attenuation equalization device $a_j$, shown in FIG. 2 shall now be explained with reference to FIGS. 3*a* to 3*d*, showing for different border line conditions the voltage $u_{LC}$ occurring at the oscillation circuit L, C, R as a function of time, it being assumed thereby, that the oscillation circuit L, C is tuned to the switching frequency of the switches ZS′ and ZS″.

There shall first be explained, with reference to FIG. 3*a*, the transmission of the signal energy from only one side P(1) of the multiplex bar P to the other side P(2). At a phase $p_j$ (see also FIG. 3*d*) to which is allocated the attenuation equalization device $a_j$ shown in FIG. 2, the switch ZS′*j* is briefly short circuited by an appropriate control impulse, so that signal energy can be transmitted from the side P(1) of the multiplex line P to the energy storer of an attenuation equalization device $a_j$ of FIG. 2, that is, to the oscillation circuit L, C, R.

The signal energy received by this oscillation circuit causes an oscillation which is more or less attenuated or de-attenuated by the action of the controllable parallel resistor R. The oscillation will be an attenuated, a de-attenuated or an increased oscillation, indicated in FIG. 3*a* by a dotted line, a dash line and a full line, respectively, depending upon whether the parallel resistance R is positive, infinite or negative. The signal energy stored in the capacitor C of the oscillation circuit is now, after one-half oscillation period, that is, at the phase $p_{j+m/2}$ (FIG. 3*d*), wherein *m* is the number of speech phases allocated to a connection, lower, equal to or higher than the signal energy received by the oscillation circuit at the instant of closure of the switch ZS′*j*, that is, at the phase $p_j$. The switch ZS″*j* is impulse-wise closed at the phase $p_{j+m/2}$, so that the signal energy which had just been stored can be transmited to the other side P(2) of the multiplex bar P (FIG. 1). The signal power level at the side P(2) of the multiplex bar P is now lower, equal to or higher than it was before on the side P(1), depending upon the resistance value of the parallel resistor R and therewith upon the time constant with which the stored signal energy decreased or increased in the oscillation circuit.

These operations are periodically repeated with the switching frequency of the switches ZS′*j* and ZS″*j*, whereby these two switches are according to the sampling theorem applicable in the transmission art, impulse-wise closed at least with twice the frequency of the signal frequency which is to be transmitted.

The foregoing explanations concerning the operation of the attenuation equalization device $a_j$, shown in FIG. 2, in connection with the transmission from the side P(1)

of the multiplex bar P to the other side P(2) thereof, apply, due to the symmetrical construction of the device, analogously likewise for the transmission of signal energy in opposite direction, that is, from the side P(2) to the side P(1) of the multiplex bar. As will be seen from FIG. 3*b*, signal energy is thereby transmitted, at the phase $p_{j+m/2}$ (FIG. 3*d*) at which the switch ZS″*j* is impulse-wise closed, from the side P(2) of the multiplex bar P, to the oscillation circuit L, C (FIG. 2), thereby exciting an oscillation. This oscillation will again be attenuated or de-attenuated or even increased, in accordance with a control signal which controls the resistor R. The switch ZS′*j* is thereupon impulse-wise closed at the phase $p_j$, whereby the signal energy which had just been stored in the oscillation circuit is transmitted to the side P(1) of the multiplex bar P.

As will be apparent from FIGS. 3*a* and 3*b* that, upon transmitting signal energy only in one direction over the multiplex bar, energy is stored in the oscillation circuit L, C always only during one-half of the switching period of the switches ZS′ and ZS″, since after the storing of signal energy over one of the two switches, the other switch is impulse-wise closed after the half-switching period, whereby the energy just stored in the oscillation circuit is given off over such switch. However, upon transmitting over the two-conductor multiplex bar P signal energy in both directions, there will not be effected, upon closure of a switch, merely a transmission of signal energy from one side of the multiplex bar into the energy storer or vice versa, from the energy storer to one side of the multiplex bar, but there will occur an exchange of signal energy between the oscillation circuit L, C and the respective side of the two-conductor multiplex bar. The voltage $u_{LC}$ appearing at the oscillation circuit L, C, then assumes a course as to time, for example, as illustrated in FIG. 3*c*. This course results from a superposition of the voltage courses shown in FIGS. 3*a* and 3*b* and is for the sake of simplicity represented only for one of the curves ($R=\infty$). The attenuation equalization device $a_j$ (FIG. 2), owing to its symmetrical structure and time-symmetrical triggering of its two switches ZS′*j* and ZS″*j*—such switches being always impulse-wise closed mutually displaced or staggered by one-half of the sampling period duration of the time multiplex communication system—acts thereby, for the signals which are to be transmitted in both directions, as a controllable attenuation member which reduces the signal voltage level by the attenuation amount $$a=T/2\tau=T/4RC$$

wherein T is the sampling period of the system and therewith the switching period with which a switch ZS′ or ZS″ is impulse-wise closed, while $\tau=2RC$ is the prevailing time constant of the oscillation circuit.

As has been said before, the attenuation amount may thereby also be negative, namely, when the oscillation circuit is deattenuated with the aid of a negative parallel resistance. As shown in FIG. 4, such resistance may be formed by a feedback coupled amplifier circuit comprising a transistor.

Referring now to FIG. 4, the transistor T*r* is as to its characteristic working point governed by the control signal which is supplied from the control line PC of the multiplex bar P, thereby altering the steepness of the transistor. This also changes the degree of de-attenuation of the oscillation circuit since the negative resistance, which appears parallel to the ohmic resistor W, has the value $$r=\frac{du_{LC}}{di_C}=\frac{\ddot{u}\cdot du_{BE}}{di_C}=\ddot{u}/S$$

wherein $u_{LC}$ is the voltage appearing in the oscillation circuit, $u_{BE}$ the base-emitter voltage and $i_C$ the collector current of the transistor T*r*, $\ddot{u}$ being the transformation ratio of the similarly referenced transformer, and S representing the steepness of the transistor T*r*.

The attenuation equalization device illustrated in FIG. 4 therefore has an attenuation $$a=\frac{T}{4\cdot C}\cdot\left(\frac{1}{W}-\frac{S}{\ddot{u}}\right)$$

by which it changes the signal voltage level of the signals which are to be transmitted over the multiplex bar P. The attenuation may be positive or negative depending upon the characteristic working point of the transistor, whereby a change, effected by the control of the working point of the transistor, with respect to the sign or of the amount of the resistance which is connected in parallel with the oscillation circuit, does not have any disturbing effect so far as the matching conditions of the respective transmission system are concerned.

In the time multiplex communication system which is in part illustrated in FIG. 4, the alteration with respect to the steepness of the characteristic working point of the transistor T*r* is obtained by effecting, at a given speech phase $p_j$, at which a connection line L*tgi* (subscriber line or trunk line) is by the periodic impulse-wise closure of the associated time channel switch ZS*i* connected with the multiplex point P(1) of the multiplex bar P, at which instant is also closed the switch ZS′*j* of the attenuation equalization device $a_j$, which switch is at this instant likewise connected with this multiplex point P(1), coincident closure of further contacts ZS*ic* and ZS′*jc* of the indicated switches, whereby a point of the connection line L*tgi* which is only traversed by the direct current flowing in the line loop, is connected with the control electrode of the transistor T*r*. A base bias voltage for the transistor T*r* is in this manner produced, which voltage depends upon the direct current flowing in the line loop and therewith upon the line attenuation. The transistor is therefore operated in a very definite working point in which it also has a very definite steepness which affects, as above explained, the degree of de-attenuation of the oscillation circuit L, C.

The current flowing in the connection line is in this manner sampled synchronously with each closure of the time channel switch ZS*i* which is allocated to a connection line L*tgi*, and the signal thus obtained, namely, a unipolar pulse with an amplitude depending upon the loop current, is transmitted to the control electrode of the transistor T*r* over the control line PC of the multiplex bar and over the further contact ZS′*jc* of the first switch of the attenuation equalization device $a_j$ which contact is actuated at the same phase.

It may be particularly noted at this point, that the control line PC which is as a matter of course required for the supervision of the loop condition of the connection line, is here additionally utilized for purposes of attenuation equalization, thus avoiding for this purpose any additional expenditure.

One-half sampling period after the closure, at a speech phase $p_j$, of the time channel switch ZS*i* of a connection line L*tgi* as well as the impulse-wise closure of the one switch ZS′*j* of the attenuation equalization device $a_j$ which is allocated to this speech phase, there will be impulse-wise closed, at the speech phase $p_{j+m/2}$ (FIG. 3*d*), the other switch ZS″*j* of this attenuation equalization device, such other switch connecting the oscillation circuit L, C with the coupling network KF (see also FIG. 1). In the coupling network, there must be coincidently closed the coupling point contact which connects the multiplex bar P(2) with another time multiplex communication system or exchange in which is located the connection line extending to a subscriber station or to a distant exchange or to a line comprising a speech energy storer, with which a connection is to be established.

Accordingly, in the time multiplex system according to the invention, the time channel switches ZS of the individual connection lines L*tg* are not actuated coincidently with the coupling point contacts of the coupling network KF (FIG. 1) which serves for mutually interconnecting several such systems, but they are actuated displaced or staggered by one-half sampling period of the system. However, it follows that the time channel switches of two connection lines, located in different time multiplex communication systems, are nevertheless operatively actuated at one and the same speech phase.

As is apparent from FIGS. 1 and 4, the time channel switches ZS, which are respectively allocated to the connection lines L*tg*, are in known manner provided with reactance networks comprising respectively coils H and inductances *l* and capacitors or capacities K and *c*. The inductances *l* represent longitudinal inductances, serving in known manner as fly wheel inductances and being upon closure of a switch ZS operative to effect complete transmission of the signal energy stored in the capacitor *c*, acting as a storage capacitor, and also to effect in opposite direction complete transmission, to the storage capacitor of the energy which is impulse-wise supplied over the switch. The oscillation circuit formed of a coil with the longitudinal inductivity *l* and a capacitor with the transverse capacity *c*, is to be tuned so that the period of its intrinsic oscillation is twice as long as the closure time *t* of the switch ZS. The circuit elements K, H and *c* are to be dimensioned so that they form a low pass filter TP the border frequency of which is at the most half as high as the switching frequency at which the switches ZS are impulse-wise actuated. The wave impedance of the low pass-filters TP is to be matched to the respective lines L*tg* with which they are connected. Upon satisfying this condition, there will be obtained very definite values for the various circuit elements of the reactance networks which are allocated to the respective switches. As a result, the low pass filters will pass the oscillations connected with the messages which are to be exchanged but will not pass the oscillations of higher frequencies which are connected with the switching impulse sequences. Accordingly, these oscillations with higher frequencies are not extended to the subscriber stations which are interconnected over the connection lines L*tg* and cannot cause any disturbances at such stations.

In the time multiplex communication system which is in part represented in FIG. 4, there is provided a further inductivity *l* which is disposed between the junction point of the two switches ZS'*j* and ZS''*j* and the oscillation circuit L, C, R of the attenuation equalization device. This inductivity *l* acts in cooperation with the circuit elements of the above explained reactance network so as to effect upon closure of the switches ZS*i* and ZS'*j*, complete transmission of the signal energy stored in the capacitor $c_1$, acting as a storage capacitor, to the energy storer of the attenuation equalization device, and also in opposite direction.

In order to obtain the desired complete energy transmission or transfer, the oscillation circuit formed by the coil with the longitudinal inductivity *l* and the energy storer L, C, is to be tuned so that its intrinsic oscillation period is twice as long as the closure time *t* of a switch ZS, ZS' or ZS''. The energy storer formed by a parallel oscillation circuit L, C can be considered as a complex apparent resistance, since its intrinsic frequency is tuned to the sampling frequency of the time multiplex communication system, that is, to the switching frequency of the switches ZS, ZS', ZS'', the switching period duration T being however greater than the switching time *t* of the respective switches. This coaction of a reactance network allocated to a switch, with the energy storer L, C and the inductivity *l* disposed ahead thereof, results practically in an attenuation-free transmission or transfer of the signal energy extended to the energy storer from one side of the multiplex bar P and of the stored signal energy to the other side of the multiplex bar.

The energy storer, the time constant of which is alterable depending upon the control signal, accordingly accepts at the instant of closure of a switch ZS' or ZS'', always the entire signal energy offered over the respective switch, no reflections being thereby caused in the multiplex bar P. This is of particular advantage as it permits to obtain in the system according to the invention, a high side tone attenuation such as it could be obtained with known attenuation equalization devices only with difficulty and with a great expenditure.

Changes may be made within the scope and spirit of the appended claims which define what is believed to be new and desired to have protected by Letters Patent.

I claim:

1. A time-multiplex communication system having individual lines, a two-wire-multiplex bar, periodically impulse-wise operated time channel switches for connecting respective individual lines, during corresponding speech phases, with said multiplex bar, a coupling network connected with the multiplex bar, over which network connections are extended between connection lines of the system as well as with connection lines of another system, a two-wire-operated attenuation equalization device disposed in said multiplex bar between the coupling network and a multiplex point at which are combined the time channel switches, and means for conducting to said attenuation equalization device incident to each speech phase at which a connection line is connected to said multiplex bar, a control signal which signifies the line attenuation of the corresponding connection line connected at such speech phase to the multiplex bar, for the purpose of controlling said device as to the attenuation or de-attenuation to be effected thereby.

2. A time multiplex system according to claim 1, wherein said attenuation equalization device comprises a single attenuation equalization member.

3. A time multiplex system according to claim 1, wherein said attenuation equalization device comprises a plurality of partial devices for the attenuation equalization, said partial devices being respectively allocated to speech phases at which respective connection lines are connectible to said multiplex bar.

4. A time multiplex system according to claim 3, wherein each respective partial device comprises an energy storer with a time constant which is variable depending upon the control signal, a pair of switches which are serially disposed in said multiplex bar and which are periodically actuated in mutually staggered relationship as to time, and means for connecting said energy storer to the junction point between said switches.

5. A time multiplex system according to claim 4, wherein said switches are closed impulse-wise staggered as to time by one-half of the sampling period duration of the system.

6. A time multiplex communication system operating with a two-wire multiplex bar to which connection lines are periodically impulse-wise connectible with the aid of time channel switches, and having connected, with the multiplex bar, a coupling network over which connections are extended between connection lines of the system as well as with connection lines of another system, comprising an attenuation equalization device disposed in the multiplex bar between the coupling network and a multiplex point at which are combined the time channel switches, said attenuation equalization device comprising a plurality of partial devices for the attenuation equalization, said partial devices being respectively allocated to speech phases at which respective connection lines are connectible to said multiplex bar, means for conducting to said attenuation equalization device incident to each speech phase of a connection line involved in a call, a control signal which signifies the line attenuation of the corresponding connection line, for the purpose of controlling said device as to the attenuation or de-attenuation to be effected thereby, each respective partial device comprising an energy storer with a time constant which is variable depending upon the control signal, a pair of switches which are serially disposed in said multiplex bar and which are periodically actuated in mutually staggered relationship as to time by one-half of the sampling period duration of the system, said energy storer comprising a parallel oscillation circuit with an intrinsic frequency which is equal to, or equal to an integral multiple, of the frequency with which said switches are in staggered time relation closed, and a parallel resistance which is controlled by said control signal, and means for connecting said energy storer to the junction point between said switches.

7. A time multiplex system according to claim 6, wherein said controlled parallel resistance is formed by an ohmic resistor and a negative resistance connected in parallel therewith.

8. A time multiplex system according to claim 7, wherein said negative resistance is formed by a feedback coupled amplifier circuit the amplifier element of which is as to the working point thereof governed by the control signal.

9. A time multiplex system according to claim 8, wherein said oscillation circuit includes a coil and the energy storer, comprising a flywheel inductivity disposed between the junction point of said switches and the energy storer, for obtaining a substantially loss-free energy exchange between the energy storer and the multiplex bar, the period of said oscillation circuit being twice as long as the closure time of one of said switches.

10. A time multiplex communication system operating with a two-conductor multiplex bar to which connection lines are periodically impulse-wise connectible with the aid of time channel switches, and having connected, with the multiplex bar, a coupling network over which connections are extended between connection lines of the system as well as with connection lines of another system, comprising an attenuation equalization device disposed in the multiplex bar between the coupling network and a multiplex point at which are combined the time channel switches, means for conducting to said attenuation equalization device incident to each speech phase of a connection line involved in a call, a control signal which signifies the line attenuation of the corresponding connection line, for the purpose of controlling said device as to the attenuation or de-attenuation to be effected thereby, said multiplex bar having an auxiliary control line, auxiliary contact means operable by the respective time channel switches for periodically impulse-wise connecting to said control line only points of the respective connection lines which are at a speech phase connected with the multiplex bar and traversed by direct current flowing in the corresponding line loops, and means comprising further auxiliary contact means for connecting to said control line the control input of said attenuation equalization device at instants at which a connection line is at the same speech phase connected to the multiplex bar.

References Cited by the Examiner

UNITED STATES PATENTS

| | | | |
|---|---|---|---|
| 2,558,439 | 6/1951 | Hurault | 179—15 |
| 2,681,384 | 6/1954 | Guanella | 179—15 |
| 2,757,283 | 7/1956 | Ingerson et al. | 325—41 |

FOREIGN PATENTS

| | | |
|---|---|---|
| 592,555 | 9/1947 | Great Britain. |

DAVID G. REDINBAUGH, *Primary Examiner.*

T. G. KEOUGH, *Assistant Examiner.*